United States Patent [19]

Charles

[11] Patent Number: 5,308,104

[45] Date of Patent: May 3, 1994

[54] STEER-SENSITIVE JOUNCE BUMPER AND BUMP PLATE

[75] Inventor: Harlan W. Charles, Harper Woods, Mich.

[73] Assignee: General Motors Corporation, Detroit, Mich.

[21] Appl. No.: 24,055

[22] Filed: Mar. 1, 1993

[51] Int. Cl.$^5$ .......................... B60G 15/07; F16F 9/32
[52] U.S. Cl. .................................. 280/668; 267/220; 267/35; 280/693
[58] Field of Search .......................... 280/668, 692, 693; 267/220, 35, 33

[56] References Cited

U.S. PATENT DOCUMENTS

| | | | |
|---|---|---|---|
| 4,462,608 | 7/1984 | Lederman | 280/668 |
| 4,721,325 | 1/1988 | Mackovjak et al. | 280/668 |
| 5,080,205 | 1/1992 | Miller et al. | 188/299 |
| 5,120,031 | 6/1992 | Charles et al. | 267/220 |

FOREIGN PATENT DOCUMENTS 0035128  2/1987  Japan ..................................... 267/35

Primary Examiner—Robert J. Oberleitner
Assistant Examiner—Peter English
Attorney, Agent, or Firm—A. Michael Tucker

[57] ABSTRACT

A steer-sensitive jounce bumper and bump plate are adapted for use with a steerable hydraulic strut. The jounce bumper is a generally tubular member formed from a compressible material having a pattern of predetermined indentations formed in its lower end. The jounce bumper is mounted about a piston rod of the strut and secured to a mount assembly. A bump plate having a series of alignment pins is mounted to an upper end of the strut. As a wheel assembly is steered, the bump plate is rotated so that misalignment occurs between the pins and the indentations. When misaligned, compression of the jounce bumper is reduced, thereby reducing the compression stroke of the strut.

10 Claims, 2 Drawing Sheets

STEER-SENSITIVE JOUNCE BUMPER AND BUMP PLATE

BACKGROUND OF THE INVENTION

1. Field of the Invention

The present invention relates generally to vehicular suspension systems, and in particular is concerned with a steer-sensitive jounce bumper and bump plate for use with a steerable hydraulic damper.

2. Description of the Related Art

Hydraulic dampers, including shock absorbers and struts, are well-known in vehicular suspension systems. The rate of damping of a hydraulic strut is often tuned by a piston valve assembly and/or a base valve assembly. Conventional piston and base valve assemblies employ various disk packs and spring-biased blow-off elements. During compression and rebound strokes of a strut, fluid flow through these valve assemblies determines the type of damping characteristics produced by the strut.

A strut is mounted between the unsprung portion of a vehicle (wheel assembly, control arm, etc.) and the sprung portion (body). A mount assembly connects a telescoping piston rod of the strut to a mounting tower formed in the body. As a wheel assembly encounters road inputs, a strut undergoes compression (jounce) and extension (rebound) strokes. Many mount assemblies include elastomeric elements to isolate the strut from the body, thereby reducing the transmission of vibrations and noise to the body caused by road inputs.

The compression stroke of a strut is controlled by a jounce bumper mounted axially on the piston rod. Many jounce bumpers are either convoluted in shape and function by a progressive stacking of the convolutions to provide resistance to jounce forces, or are solid in cross section and utilize soft elastomers in straight compression.

The art continues to seek improvements. It is desirable to provide a jounce bumper which prevents a strut from fully compressing at large steer angles. Prevention of full compression of a strut restricts body lean and results in better road handling. Furthermore, a tighter wheel-to-body relationship for body styling can be accomplished when strut compression is limited.

SUMMARY OF THE INVENTION

The present invention includes a jounce bumper and bump plate for preventing full compression of a steerable hydraulic strut. Reduction of strut compression is controlled by the steer angle of the vehicle's wheels. The jounce bumper and bump plate are economical to manufacture and can be adapted for use with conventional struts.

In a preferred embodiment, a steer-sensitive jounce bumper and bump plate are adapted for use with a steerable hydraulic strut. The jounce bumper is a generally tubular member formed from a compressible material having a pattern of predetermined indentations formed in its lower end. The jounce bumper is mounted about a piston rod of the strut and secured to a mount assembly. A bump plate having a series of alignment pins is mounted to an upper end of the strut. As a wheel assembly is steered, the bump plate is rotated so that misalignment occurs between the pins and the indentations. When misaligned, compression of the jounce bumper is reduced, thereby reducing the compression stroke of the strut.

DETAILED DESCRIPTION OF THE PREFERRED EMBODIMENT

Figure 1:
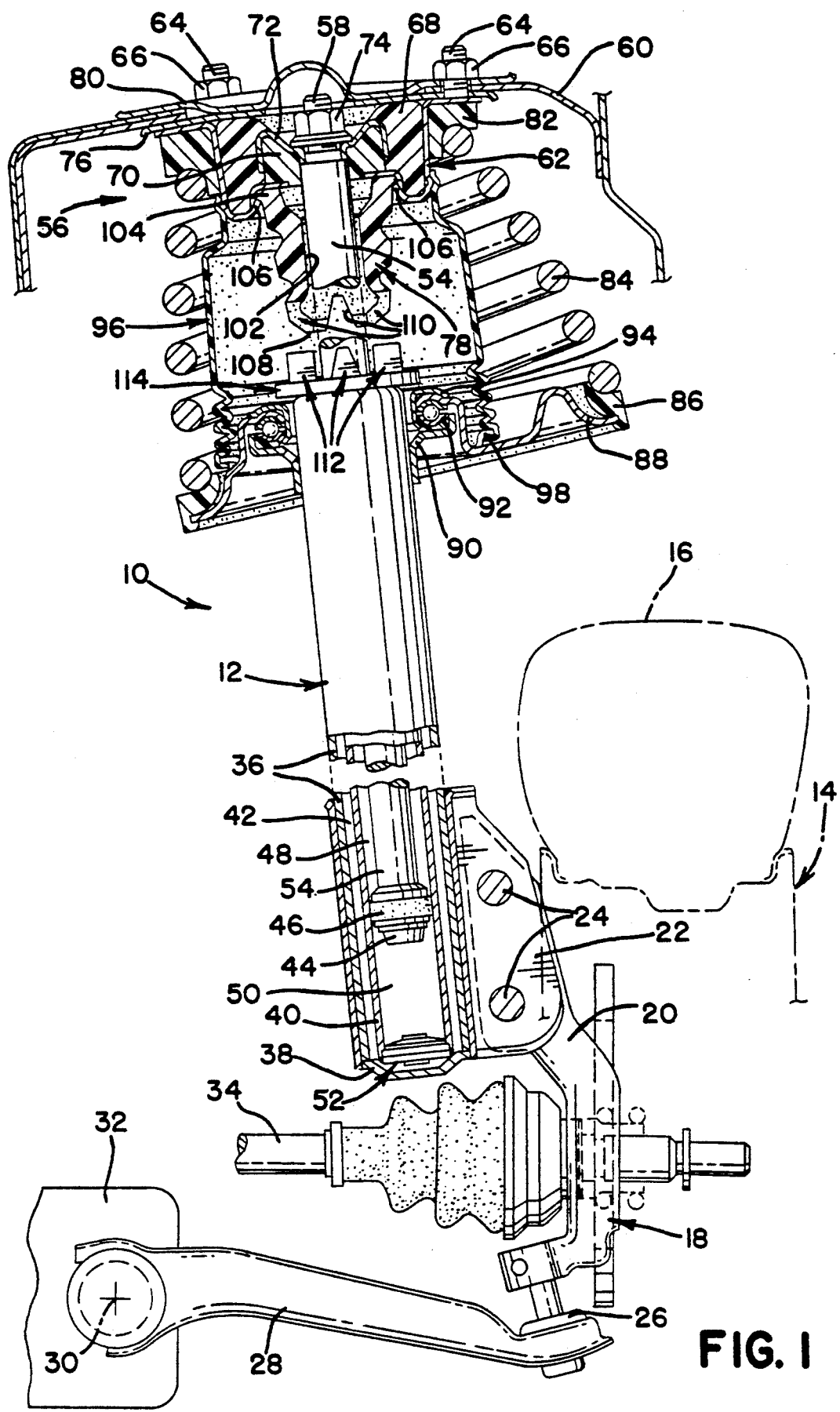
FIG. 1 is an elevational view partially in section of a front steerable suspension system illustrating a preferred embodiment of a steer-sensitive jounce bumper and bump plate according to the present invention.

A steerable vehicular suspension system is indicated generally at 10 in FIG. 1. A hydraulic strut indicated generally at 12 is operatively connected between the unsprung portion of a vehicle and the sprung portion in a well-known manner.

The unsprung portion of the vehicle includes a steerable road wheel assembly 14, including a pneumatic tire 16, operatively mounted on a steering knuckle 18. The steering knuckle 18 includes an upper arm 20 that is secured to a partially cylindrical bracket 22 by fasteners 24. The bracket 22 receives a lower end of the strut 12 and is secured thereto by suitable means including welding. The steering knuckle 18 is supported by means of a lower ball joint 26 to the outboard end of a lower control arm 28. The inboard end of the control arm 28 pivots at axis 30 from a cross member of the engine cradle 32 or other support structure. The wheel assembly 14 is powered by a drive axle assembly 34 extending from the output of a differential (not illustrated). Steering linkages (not illustrated) are connected to the steering knuckle 18 and rotate the knuckle 18 with respect to the control arm 28 on the ball joint 26 to steer the wheel assembly 14 in a desired direction. As the knuckle 18 is rotated, the strut 12 rotates via the upper arm 20, bracket 22 and fasteners 24.

The strut 12 includes a reservoir tube 36 closed at its lower end by a base cup 38. A fluid-filled cylinder tube 40 is concentrically mounted inside the reservoir tube 36. An annular chamber between the reservoir tube 36 and the cylinder tube 40 defines a fluid reservoir 42. A valved piston 44 having an outer circumferential band 46 of reduced-friction material is slidably mounted in the cylinder tube 40. The piston 44 divides the interior volume of the cylinder tube 40 into an upper chamber 48 and a lower chamber 50. A conventional valve assembly (not illustrated) carried by the piston 44 controls the flow of fluid between chambers 48 and 50 as the piston 44 reciprocates due to road inputs. A compression valve assembly 52, closing the lower end of the cylinder tube 40 and securely mounted to the base cup 38, controls fluid flow between the lower chamber 50 and the reservoir 42 in a well-known manner. A piston rod 54 is secured at its inboard end to the piston 44 and at its outboard end projects beyond the reservoir tube 36.

A mount assembly 56 secures the upper, threaded end 58 of piston rod 54 to a mounting tower 60 formed in the vehicular body. A cup-shaped lower plate 62 includes a plurality of threaded bolts 64 which project upwardly through respective openings in the mounting tower 60. Respective nuts 66 are threaded onto the bolts 64 to secure the mount assembly 56 to the mounting tower 60. An annular elastomeric isolator 68 is fitted in an inner portion of the lower plate 62. An annular elastomeric bushing 70 is fitted about the upper threaded end 58 of the piston rod 54 and retained by a cap 72 and nut 74. An upper plate 76 is positioned between the lower plate 62 and the mounting tower 60. A generally tubular jounce bumper 78 is secured to a lower surface of the lower plate 62 and fitted over the piston rod 54. The jounce bumper 78 will be described in detail below. If desired, a cover plate 80 is retained on an upper surface of the mounting tower 60.

To assemble the strut 12 to the mounting tower 60, the threaded end 58 of the piston rod 54 is inserted through the jounce bumper 78 and bushing 70 to receive cap 72 and nut 74. In this manner, the piston rod 54 and mount assembly 56 are fixed with respect to the mounting tower 60. As the knuckle 18 rotates the reservoir tube 36 and cylinder tube 40, the piston 44 slides on its circumferential band 46 with respect to the inner surface of the cylinder tube 40 so that relative rotation occurs between the reservoir tube 36 and the piston rod 54.

An upper elastomeric isolator 82 is concentrically mounted about the lower plate 62 and seats the upper end of a coil suspension spring 84. The lower end of the spring 84 is seated on a lower elastomeric isolator 86 and lower spring seat 88. A bearing support 90 is secured to the outer surface of the reservoir tube 36 and seats a bearing assembly 92. A radially inner portion of the lower spring seat 88 is supported on the bearing assembly 92 so that reservoir tube 36 can be rotated without rotating the suspension spring 84 and any appreciable rotation of the piston rod 54. An annular retention member 94 secures the spring seat 88 to the bearing assembly 92. The upper end of a dust tube 96 is fitted on the lower plate 62 while the lower end of the dust tube 96 is secured to a mounting flange 98 on the lower spring seat 88.

Figure 2:
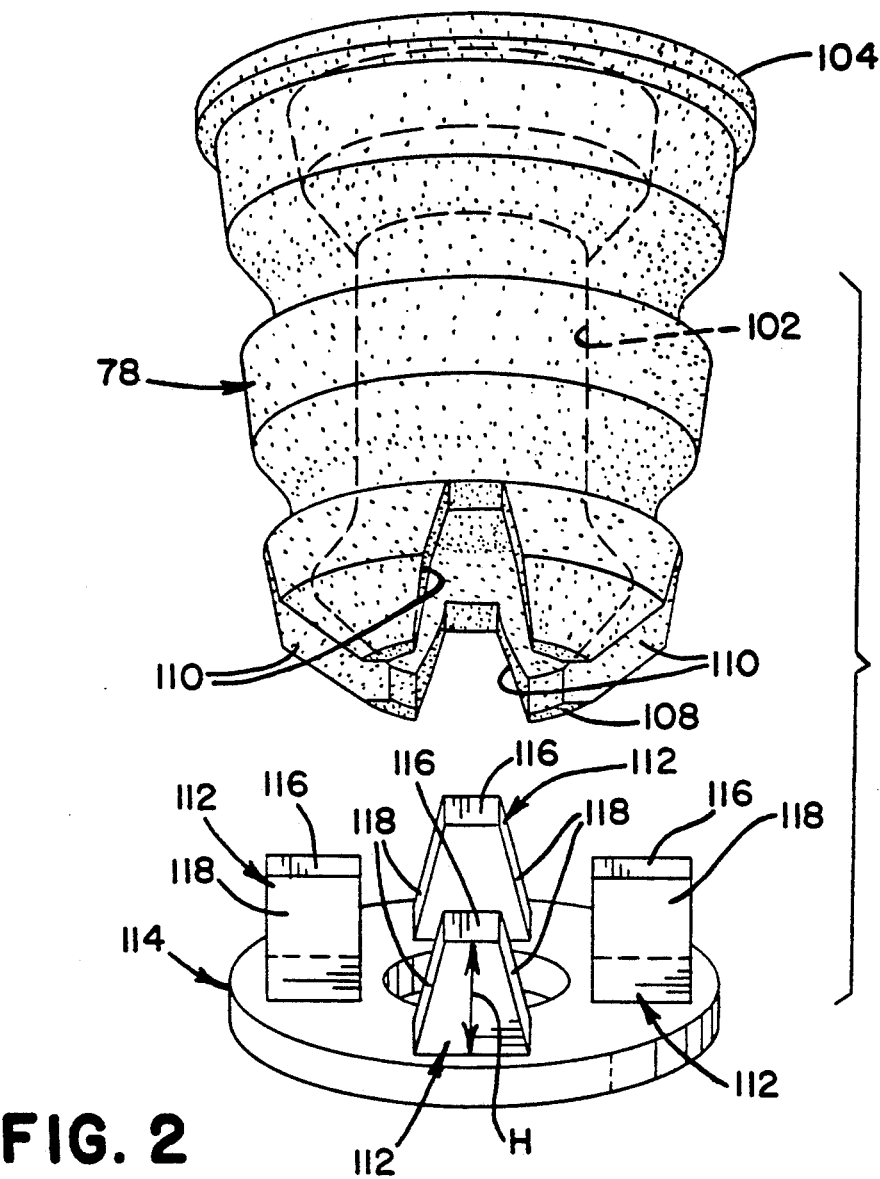
FIG. 2 is an enlarged perspective view of the present jounce bumper and bump plate removed from the system of FIG. 1.

The jounce bumper 78 is preferably formed from a micro-cellular compressible foam or elastomeric material and is a generally tubular member having an axial channel 102 fitted over the piston rod 54. An upper end 104 of the jounce bumper 78 is fixed to the mount assembly 56 by any suitable means, including mounting tangs 106 formed in the lower plate 62 and engaged with the jounce bumper 78. A lower end 108 of the jounce bumper 78 includes a pattern of predetermined indentations or cut-outs 110 preferably provided in an annular fashion. In the embodiment illustrated, four indentations 110 are formed in the lower end 108 in a pattern complimentary to a series of upwardly projecting alignment pins 112 provided on an upper surface of a bump plate 114. The bump plate 114 is a generally planar member secured to a top surface of the reservoir tube 36. As illustrated best in FIG. 2, the pins 112 are formed in a generally V-shape having planar top surfaces 116 and angled sides 118 that act as camming surfaces as the jounce bumper 78 engages the pins 112. Preferably, the pins 112 are formed from a rigid, non-compressible material.

During a compression (jounce) stroke of the strut 12, the piston rod 54 is slidably received into the cylinder tube 40. As the piston rod 54 nears the end of its compression stroke, the jounce bumper 78 engages the bump plate 114 and compresses to provide isolation from what may be an otherwise harsh impact.

The present jounce bumper 78 and bump plate 114 provide an ability to tune the jounce stroke of the strut 12 depending upon the steer angle. When the steer angle of the knuckle 18 exceeds a predetermined range, then the reservoir tube 36 with its attached bump plate 114 rotates to an extent that the pins 112 no longer align with the indentations 110. When misalignment occurs, jounce stroke is limited as the lower end of the jounce bumper 78 engages the top surfaces 116 of the pins 112 and begins to compress, so that as the jounce bumper 78 reaches full compression, the jounce stroke of the strut 12 is reduced by the height H of the pins 112.

It is appreciated that various modifications can be made with the present jounce bumper 78 and bump plate 114 to achieve desired results. For example, the pins 112 can be formed with a height H of 15 mm. When the wheel assembly 14 is turned so that the pins 112 are fully misaligned with the indentations 110, the jounce stroke of the strut 12 is reduced by 15 mm. If the height H is increased, then the jounce stroke is further reduced. If the height H is less than 15 mm, then the jounce stroke is increased.

The steer sensitivity of the present jounce bumper 78 and bump plate 114 can also be tuned. For example, the pins 112 and indentations 110 can be formed so that a rotation of 25 degrees will fully misalign the pins 112 from the indentations 110. Thus, for steer angles greater that 25 degrees, the jounce stroke will be reduced by the height H of the pins 112. For straight ahead driving, i.e., no steer angle, the pins 112 and indentations 110 fully align so that no reduction will occur in the jounce stroke. Depending upon the shape of the pins 112 and indentations 110, and the material used for the jounce bumper 78, various reductions in jounce stroke can be achieved between zero and 25 degrees of steer angle. The shapes of the pins 112 and indentations 110 can be configured to be sensitive to smaller or larger steer angles.

Although the present invention has been described with reference to a preferred embodiment, workers skilled in the art will recognize that changes may be made in form and detail without departing from the spirit and scope of the invention.

The embodiments of the invention in which an exclusive property or privilege is claimed are defined as follows:

1. A cooperating jounce bumper and bump plate set for use with a steerable strut and mount assembly in a vehicular suspension system, comprising:
    (a) a jounce bumper having an axial channel for receiving a telescoping piston rod of the strut, an upper end for attachment to the mount assembly and a lower end including a pattern of indentations; and
    (b) a bump plate having a lower surface for mounting on the strut and an upper surface including a plurality of pins complimentary to the indentations of the jounce bumper.

2. The set specified in claim 1 wherein the indentations of the jounce bumper are formed in a radially-shaped pattern about the circumference of the lower end.

3. The set specified in claim 1 wherein the pins of the bump plate have a generally V-shape.

4. The set specified in claim 1 wherein the pins are formed from a non-compressible material.

5. The set specified in claim 1 wherein the jounce bumper is a generally tubular member formed from a compressible material.

6. A vehicular suspension system for a steerable wheel assembly, comprising:

(a) a hydraulic strut having a telescoping piston rod projecting from a first end;
(b) means for securing a second end of the strut to the wheel assembly so that the strut rotates with the wheel assembly;
(c) mount means for attaching an end of the piston rod to a vehicle so that the mount means does not rotate as the wheel assembly is steered;
(d) a jounce bumper concentrically mounted on the piston rod and mounted at a first end to the mount means so that the jounce bumper does not rotate as the wheel assembly is steered;
(e) a bump plate mounted on the strut so that the bump plate rotates with the strut as the wheel assembly is steered;
(f) a pattern of indentations in a second end of the jounce bumper; and
(g) a plurality of pins on the bump plate aligned with the indentations of the jounce bumper when the wheel assembly is at a predetermined steer angle.

7. The system specified in claim 6 wherein the indentation of the jounce bumper are formed in a radially-spaced pattern about the circumference of the jounce bumper.

8. The system specified in claim 6 wherein the pins of the bump plate have a generally V-shape.

9. The system specified in claim 6 wherein the pins are formed from a non-compressible material.

10. The system specified in claim 6 wherein the jounce bumper is formed from a compressible material.

* * * * *